United States Patent
Han et al.

(10) Patent No.: US 12,442,049 B2
(45) Date of Patent: Oct. 14, 2025

(54) METHOD FOR RAPIDLY DETECTING THE TOTAL NITROGEN CONTENT OF THE SOIL IN AN URBAN GREEN LAND BY USING ARCHAEA MOLECULAR MARKER OTU300

(71) Applicant: Shanghai Academy Of Landscape Architecture Science And Planning, Shanghai (CN)

(72) Inventors: Jigang Han, Shanghai (CN); Lang Zhang, Shanghai (CN); Weiwei Zhang, Shanghai (CN); Gangyong Zhao, Shanghai (CN)

(73) Assignee: SHANGHAI ACADEMY OF LANDSCOPE ARCHITECTURE SCIENCE AND PLANNING, Shanghai (CN)

( * ) Notice: Subject to any disclaimer, the term of this patent is extended or adjusted under 35 U.S.C. 154(b) by 1008 days.

(21) Appl. No.: 17/595,214

(22) PCT Filed: May 14, 2020

(86) PCT No.: PCT/CN2020/090172
§ 371 (c)(1),
(2) Date: Nov. 11, 2021

(87) PCT Pub. No.: WO2021/142989
PCT Pub. Date: Jul. 22, 2021

(65) Prior Publication Data
US 2022/0220538 A1 Jul. 14, 2022

(30) Foreign Application Priority Data
Jan. 19, 2020 (CN) .......................... 202010062417.6

(51) Int. Cl.
*C12Q 1/6851* (2018.01)
*C12Q 1/689* (2018.01)
*G01N 33/24* (2006.01)

(52) U.S. Cl.
CPC .......... *C12Q 1/689* (2013.01); *C12Q 1/6851* (2013.01); *G01N 33/24* (2013.01)

(58) Field of Classification Search
CPC ........ C12Q 1/06; C12Q 1/689; C12Q 1/6851; C12Q 1/6876; C12N 15/11; G01N 33/24
See application file for complete search history.

(56) References Cited

U.S. PATENT DOCUMENTS

2004/0023207 A1 * 2/2004 Polansky ............. A61K 48/005
435/456

OTHER PUBLICATIONS

Pires et al., Denaturing Gradient Gel Electrophoresis and Barcoded Pyrosequencing Reveal Unprecedented Archaeal Diversity in Mangrove Sediment and Rhizosphere Samples, Applied and Environmental Microbiology, 2012, 78, 5520-5528 (Year: 2012).*

(Continued)

*Primary Examiner* — Robert T. Crow
*Assistant Examiner* — Allison E Schloop
(74) *Attorney, Agent, or Firm* — HAUPTMAN HAM, LLP (57) ABSTRACT

The present invention discloses a method for rapidly detecting the total nitrogen content of the soil in an urban green land by using archaea molecular marker OTU300. The present invention provides a DNA molecule (probe), as shown in SEQ ID NO.1 of the sequence listing. The present invention also protects the application of the probe in detecting or assisting in detecting the total nitrogen content of the soil. The present invention also protects the application of the probe in comparing the total nitrogen content of the soil in different plots. Using the method provided by the present invention to detect the total nitrogen content of the (Continued)

soil or compare the total nitrogen content of the soil of different plots has the following advantages: small sample demand, no need for pre-treatment, short required time, low labor cost, and realizing the rapid automatic detection of large quantities of samples. The present invention deserves to apply and promote in the evaluation of soil samples.

3 Claims, 1 Drawing Sheet

Specification includes a Sequence Listing.

(56) References Cited

OTHER PUBLICATIONS

Arya et al., Basic principles of real-time quantitative PCR, Expert Review of Molecular Diagnostics, 2005, 5, 209-219 (Year: 2005).*
GenBank accession No. GQ127156.1 [online]. GenBank, 2009 [retrieved on Nov. 13, 2024]. Retrieved from: https://www.ncbi.nlm.nih.gov/nuccore/GQ127156.1 (Year: 2009).*
GenBank accession No. HQ285266.1 [online]. GenBank, 2011 [retrieved on Nov. 13, 2024]. Retrieved from: https://www.ncbi.nlm.nih.gov/nuccore/HQ285266.1 (Year: 2011).*
GenBank accession No. JN083919.1 [online]. GenBank, 2011 [retrieved on Nov. 13, 2024]. Retrieved from: https://www.ncbi.nlm.nih.gov/nuccore/JN083919.1 (Year: 2011).*
GenBank accession No. JF529737.1 [online]. GenBank, 2011 [retrieved on Nov. 13, 2024]. Retrieved from: https://www.ncbi.nlm.nih.gov/nuccore/JF529737.1 (Year: 2011).*
GenBank accession No. AB328918.1 [online]. GenBank, 2019 [retrieved on Nov. 13, 2024]. Retrieved from: https://www.ncbi.nlm.nih.gov/nuccore/AB328918.1 (Year: 2019).*
GenBank accession No. KJ549348.1 [online]. GenBank, 2014 [retrieved on Nov. 13, 2024]. Retrieved from: https://www.ncbi.nlm.nih.gov/nuccore/KJ549348.1 (Year: 2014).*
GenBank accession No. FN554051.1 [online]. GenBank, 2011 [retrieved on Nov. 13, 2024]. Retrieved from: https://www.ncbi.nlm.nih.gov/nuccore/FN554051.1 (Year: 2011).*
GenBank accession No. KF641428.1 [online]. GenBank, 2013 [retrieved on Nov. 13, 2024]. Retrieved from: https://www.ncbi.nlm.nih.gov/nuccore/KF641428.1 (Year: 2013).*
GenBank accession No. JQ222502.1 [online]. GenBank, 2012 [retrieved on Nov. 13, 2024]. Retrieved from: https://www.ncbi.nlm.nih.gov/nuccore/JQ222502.1 (Year: 2012).*
GenBank accession No. KF585285.1 [online]. GenBank, 2014 [retrieved on Nov. 13, 2024]. Retrieved from: https://www.ncbi.nlm.nih.gov/nuccore/KF585285.1 (Year: 2014).*
GenBank accession No. JX670782.1 [online]. GenBank, 2013 [retrieved on Nov. 13, 2024]. Retrieved from: https://www.ncbi.nlm.nih.gov/nuccore/JX670782.1 (Year: 2013).*
Applied Biosystems, TaqMan® Universal PCR Master Mix Protocol, Applied Biosystems, 2002, 1-60 (Year: 2002).*
International Search Report issued in International Application No. PCT/CN2020/090172; issued Jul. 15, 2021; 10 pgs.

* cited by examiner

SEQUENCE LISTING

<160> NUMBER OF SEQ ID NOS: 8

<210> SEQ ID NO 1
<211> LENGTH: 21
<212> TYPE: DNA
<213> ORGANISM: Artificial sequence
<220> FEATURE:
<223> OTHER INFORMATION: Synthesized

<400> SEQUENCE: 1
ttggcttcgc gctaacccag t                                               21

<210> SEQ ID NO 2
<211> LENGTH: 466
<212> TYPE: DNA
<213> ORGANISM: Artificial sequence
<220> FEATURE:
<223> OTHER INFORMATION: Synthesized

<400> SEQUENCE: 2
tgtcagccgc cgcggtaata ccagcacccc gagtggtcgg gacgattatt gggcctaaag      60
catccgtagc cggttctgca agtctcccgt taaatccaac tgctcaacag gtgggctgcg     120
gaggatacta cagagctagg aggcaggaga ggcaagcggt actcagtggg tagggtaaa     180 atccgttgat ccattgaaga ccaccagtgg cgaaggcggc ttgccagaat gcgctcgacg     240
gtgagggatg aaagctgggg gagcaaaccg gattagatac ccgggtagtc ccagccgtaa     300
acgatgcaga ctcggtgatg ggttggcttc gcgctaaccc agtgccgcag ggaagccgtt     360
aagtctgccg cctgggtagt acggtcgcaa gactgaaact taaggaatt ggcgggggag     420 caccacaagg ggtgaagcct gcggttcaat tggattcaac gccgga                    466

<210> SEQ ID NO 3
<211> LENGTH: 466
<212> TYPE: DNA
<213> ORGANISM: Artificial sequence
<220> FEATURE:
<223> OTHER INFORMATION: Synthesized

<400> SEQUENCE: 3
tgtcagccgc cgcggtaata ccagcacccc gagtggtcgg gacgattatt gggcctaaag      60
catccgtagc cggtcatgca agtcttccgt taaatccacc cgctcaacgg ttgggctgcg     120
gaggatacta cgtggctagg aggcgggaga ggcaagcggt actcagtggg tagggtaaa     180 atcctttgat ccattgaaga ccaccagtgg cgaaggcggc ttgccagaac gcgctcgacg     240
gtgagggatg aaagctgggg gagcaaaccg gattagatac ccgggtagtc ccagctgtaa     300
acgatgcaga ctcggtgatg ggatggcctc gagctatccc agtgccgcag ggaagccgtt     360
aagtctgccg cctggggagt acggtcgcaa gactgaaact taaggaatt ggcgggggag     420 caccacaagg ggtgaagcct gcggttcaat tggattcaac gccgga                    466

<210> SEQ ID NO 4
<211> LENGTH: 18
<212> TYPE: DNA
<213> ORGANISM: Artificial sequence
<220> FEATURE:
<223> OTHER INFORMATION: Synthesized

<400> SEQUENCE: 4
tgycagccgc cgcggtaa                                                   18

```
<210> SEQ ID NO 5
<211> LENGTH: 19
<212> TYPE: DNA
<213> ORGANISM: Artificial sequence
<220> FEATURE:
<223> OTHER INFORMATION: Synthesized

<400> SEQUENCE: 5
yccggcgttg avtccaatt                                              19

<210> SEQ ID NO 6
<211> LENGTH: 20
<212> TYPE: DNA
<213> ORGANISM: Artificial sequence
<220> FEATURE:
<223> OTHER INFORMATION: Synthesized

<400> SEQUENCE: 6
aggatactac agagctagga                                             20

<210> SEQ ID NO 7
<211> LENGTH: 20
<212> TYPE: DNA
<213> ORGANISM: Artificial sequence
<220> FEATURE:
<223> OTHER INFORMATION: Synthesized

<400> SEQUENCE: 7
acccgctcaa cggttgggct                                             20

<210> SEQ ID NO 8
<211> LENGTH: 20
<212> TYPE: DNA
<213> ORGANISM: Artificial sequence
<220> FEATURE:
<223> OTHER INFORMATION: Synthesized

<400> SEQUENCE: 8
tgatgggatg gcctcgagct                                             20
```

METHOD FOR RAPIDLY DETECTING THE TOTAL NITROGEN CONTENT OF THE SOIL IN AN URBAN GREEN LAND BY USING ARCHAEA MOLECULAR MARKER OTU300

RELATED APPLICATIONS

The present application is a U.S. National Phase of International Application Number PCT/CN2020/090172 filed May 14, 2020 and claims priority to Chinese Application Number 202010062417.6 filed Jan. 19, 2020.

TECHNICAL FIELD

The present invention belongs to the field of biotechnology and relates to a method for rapidly detecting the total nitrogen content of the soil in an urban green land by using archaea molecular marker OTU300.

INCORPORATION BY REFERENCE

The sequence listing provided in the file entitled GNPYX20025_SQL_Modified.txt, which is an ASCII text file that was created on Jul. 27, 2021, and which comprises 2,913 bytes, is hereby incorporated by reference in its entirety.

BACKGROUND

The construction of urban landscaping is an important part of the construction of ecological civilization and a good environment. It plays an important role in optimizing the urban environment, improving the quality of life of the people, and promoting the sustainable development of the city. As the material basis of the urban ecological environment, the quality of the urban green land soil directly affects the healthy growth of plants and the performance of ecological benefits and landscape functions, and to a certain extent determines the quality of urban green land. Therefore, scientific and objective monitoring and evaluation of soil quality is an important reference basis for the management of urban green lands.

At present, the detection of soil quality indicators in urban green land mainly follows traditional physical and chemical detection methods, which require a lot of samples, a complicated pretreatment process, a long cycle, and a high cost on human resources. So, it is difficult to achieve rapid detection of large quantities of samples. Soil microorganisms have comprehensive, sensitive, and functional characteristics to the changes in the soil environment. It is of great practical significance to explore the rapid and automatic detection technology for soil quality indicators in urban green land by detecting the abundance of specific microbial groups.

The soil total nitrogen is an important indicator of soil fertility quality. Soil total nitrogen includes all forms of organic and inorganic nitrogen, and it is a source and store pool that marks the total amount of soil nitrogen and supplies available nitrogen to plants. It can comprehensively reflect the status of soil nitrogen and can be used to assess soil nitrogen supply capacity. Soil total nitrogen is affected by natural factors such as soil-forming parent material, geography, climate, organisms, and human factors such as greening maintenance. Its distribution in soil shows significant spatial heterogeneity. The soil total nitrogen has become a routine item of soil quality analysis and laboratory measurement in various countries.

SUMMARY OF THE INVENTION

The purpose of the present invention is to provide a method for rapidly detecting the total nitrogen content of the soil in an urban green land by using archaea molecular marker OTU300.

The present invention provides a primer-probe set, which is composed of a specific primers pair and a specific probe; the specific primers pair consists of the primer 524F-10-ext shown as SEQ ID NO.4 of the sequence listing and the primer Arch958R-mod shown as SEQ ID NO.5 of the sequence listing; the nucleotide sequence of the specific probe is shown as SEQ ID NO.1 of the sequence listing. The specific probe is a Taqman probe. The Taqman probe has a fluorescent group at its 5'end and a fluorescence quenching group at its 3'end. The fluorescent group may specifically be FAM. The fluorescence quenching group may specifically be TAMRA.

The present invention also claims the application of the primer-probe set in detecting or assisting in detecting the total nitrogen content of the soil.

The present invention also claims the application of the primer-probe set in comparing the total nitrogen content of the soil in different plots.

The present invention also claims a kit, which comprises the primer-probe set.

The function of the kit is as follows (a) or (b):
(A) Detecting or assist in detecting the total nitrogen content of the soil;
(B) Comparing the total nitrogen content of the soil in different plots.

The kit also includes a carrier that records Method A or Method B as described below.

The present invention also provides a DNA molecule (probe), shown in SEQ ID NO.1 of the sequence listing.

The DNA molecule (probe) may or may not be labeled with a label. The label refers to any atom or molecule that can be used to provide a detectable effect and can be attached to a nucleic acid. The Label includes but not limited to dyes; radiolabels, such as 32P; binding moieties, such as biotin; haptens, such as digoxin (DIG); luminescent, phosphorescent, or fluorescent moieties; and fluorescent dyes alone or fluorescent dyes combined with moieties, of which the emission spectrum can be suppressed or shifted by fluorescence resonance energy transfer (FRET). The labels can provide a signal that can be detected by fluorescence, radioactivity, colorimetry, gravimetry, X-ray diffraction or absorption, magnetism, enzyme activity, and so on. The labels can be a charged moiety (positive or negative) or optionally, can be neutral. The labels may include a nucleic acid or protein sequence or a combination thereof, as long as the sequence containing labels is detectable. In some embodiments, directly detect the nucleic acid without the label (e.g., read the sequence directly).

The present invention provides a Taqman probe, its nucleotide sequence shown as SEQ ID NO.1 of the sequence listing. The Taqman probe has a fluorescent group at the 5'end and a fluorescence quenching group at the 3'end. The fluorescent group may specifically be FAM. The fluorescence quenching group may specifically be TAMRA.

The present invention also claims the application of the DNA molecule or the Taqman probe in detecting or assist in detecting the total nitrogen content of the soil.

The present invention also claims the application of the DNA molecule or the Taqman probe in comparing the total nitrogen content of the soil in different plots.

The present invention also provides a method (Method A) for detecting total nitrogen content in the soil, which includes the following steps:

Using the total DNA of the soil sample as a template to perform real-time fluorescent quantitative PCR; The amplification primer pair of real-time fluorescence quantitative PCR is composed of primer 524F-10-ext shown as SEQ ID NO.4 of the sequence listing and primer Arch958R-mod shown as SEQ ID NO.5 of the sequence listing. The nucleotide sequence of the probe for real-time fluorescence quantitative PCR is shown as SEQ ID NO.1 of the sequence listing.

The Ct value is obtained by real-time fluorescent quantitative PCR; the copy number is calculated according to the Ct value, and the total nitrogen content in the soil sample is calculated by the copy number content in the soil sample.

The probe of real-time fluorescent quantitative PCR is Taqman probe. The Taqman probe has a fluorescent group at the 5'end and a fluorescence quenching group at the 3'end. The fluorescent group may specifically be FAM. The fluorescence quenching group may specifically be TAMRA.

The copy number is the copy number of the target fragment of the probe.

The method for calculating the total nitrogen content in the soil sample by calculating the copy number content in the soil sample is: substituting the copy number content of the soil sample into a linear equation to obtain the total nitrogen content of the soil sample.

The linear equation is $y=0.0361x+0.6785$; $R^2=0.9151$; y represents total nitrogen content, and the unit is g/kg; x represents copy number content of target OTU, and the unit is $\times 10^6$ copies/g.

The method of calculating the copy number based on the Ct value is: Substituting the Ct value into the standard curve equation to obtain the copy number.

The preparation method of the standard curve equation is: ligate the DNA molecule shown as SEQ ID NO.2 of the sequence listing to the pMD18-T vector to obtain OTU300 standard plasmid; and use the OTU300 standard plasmid to produce a standard curve equation with the logarithm of the copy number as the independent variable and Ct as the dependent variable. The logarithm of the copy number is the logarithm with base 10 of the copy number.

Preparation method of total DNA of soil samples: adopt Mo_Bio PowerSoil® DNA Isolation Kit (Mo_Bio Laboratories, Carlsbad, Inc., CA, USA) to extract total DNA of soil samples.

The real-time fluorescent quantitative PCR is performed on LightCycler® 96 real-time fluorescent quantitative PCR instrument.

The real-time fluorescent quantitative PCR reaction system (20 μL) is: 10 μL Premix Ex Taq (Takara, Dalian, China), 0.4 μL primer 524F-10-ext (SEQ ID NO.4), 0.4 μL primer Arch958R-mod (SEQ ID NO.5), 0.2 μL probe (SEQ ID NO.1), 2 μL template solution and 7 μL sterile water. In the reaction system, the concentration of primer 524F-10-ext (SEQ ID NO.4) is 0.2 μM, the concentration of primer Arch958R-mod (SEQ ID NO.5) is 0.2 μM, and the concentration of probe (SEQ ID NO.1) is 0.1 μM. In the reaction system, the content of template DNA is 7 ng.

The real-time fluorescent quantitative PCR reaction program is pre-denaturation at 95° C. for 120 s; denaturation at 95° C. for 10 s, annealing extension at 60° C. for 45 s, 45 cycles.

The present invention also provides a method for comparing the total nitrogen content of the soil in different plots (Method B), which includes the following steps:

testing the soil samples of more than two plots according to Method A;

comparing the total nitrogen content in the soil of each plot based on the test results.

Any of the above-mentioned soil is green land soil.

Any of the above-mentioned plots is a green land plot.

Any of the above-mentioned soil is green land soil in China.

Any of the above-mentioned plots is a green land plot in China.

Any of the above-mentioned soil is urban green land soil.

Any of the above-mentioned plots is an urban green land plot.

Any of the above-mentioned soil is green land soil in the Yangtze River Delta of China.

Any of the above-mentioned plots is a green land plot in the Yangtze River Delta of China.

Any of the above-mentioned soil is urban green land soil in the Yangtze River Delta of China.

Any of the above-mentioned plots is an urban green land plot in the Yangtze River Delta of China.

Any of the above-mentioned soil is park green land soil.

Any of the above-mentioned plots is a park green land plot.

Any of the above-mentioned soil is urban park green land soil.

Any of the above-mentioned plots is an urban park green land plot.

Any of the above-mentioned soil is park green land soil in the Yangtze River Delta of China.

Any of the above-mentioned plots is a park green land plot in the Yangtze River Delta of China.

Any of the above-mentioned soil is urban park green land soil in the Yangtze River Delta of China.

Any of the above-mentioned plots is an urban park green land plot in the Yangtze River Delta of China.

The Yangtze River Delta refers to China's Shanghai, Jiangsu Province, and Zhejiang Province.

Any of the above-mentioned soil samples are taken from 0-20 cm surface soil.

EMBODIMENTS

The following examples facilitate a better understanding of the present invention but do not limit the present invention. The experimental methods in the following examples, unless otherwise specified, are all conventional. The experimental materials used in the following examples, unless otherwise specified, are all purchased from conventional biochemical reagent stores. The quantitative experiments in the following examples are all set to repeat the experiment three times, and the results are averaged.

The soil quality indicators are determined according to relevant national standards, industry standards, and local standards, see Table 1 for details.

TABLE 1

Determination methods of soil quality indicators

| Detected Indicator | Determination method |
|---|---|
| pH | LY/T 1239-1999 Determination of pH value in forest soil |
| conductivity | LY/T 1251-1999 Analysis methods of watersoluble salts of forest soil (conductivity method) |
| organic matter | NY/T 1121.6-2006 Method for determination of soil organic matter |
| total nitrogen | LY/T 1228-2015 Nitrogen determination methods of forest soil (Kjeldahlmethod) |
| available nitrogen | LY/T 1228-2015 Nitrogen determination methods of forest soil (alkali-diffusion method) |
| total phosphorus | LY/T 1232-2015 Phosphorus determination methods of forest soil (alkali fusion Mo-Sb anti spectrophotometric method) |
| total potassium | LY/T 1234-2015 Potassium determination methods of forest soil (alkali fusion method) |
| available phosphorus | DB31/T 661-2012 Appendix F AB-DTPA extraction/inductively coupled plasma mass spectrometer |
| available potassium | DB31/T 661-2012 Appendix F AB-DTPA extraction/inductively coupled plasma emission spectrometer |
| available sulfur | DB31/T 661-2012 Appendix F AB-DTPA extraction/inductively coupled plasma mass spectrometer |
| available chlorine | Refer to Appendix E (watersaturated extraction) in DB31/T 661-2012 |
| exchangeable sodium | Refer to Appendix E (watersaturated extraction) in DB31/T 661-2012 |
| total arsenic | GB/T22105.2-2008 Soil quality-Analysis of total mercury, arsenic and lead contents--Atomic fluorescence spectrometry |
| total bronze | Total digestion inductively coupled plasma mass spectrometer method |
| total zinc | Total digestion inductively coupled plasma mass spectrometer method |
| total lead | Total digestion inductively coupled plasma mass spectrometer method |
| total chromium | Total digestion inductively coupled plasma mass spectrometer method |
| total nickel | Total digestion inductively coupled plasma mass spectrometer method |
| available calcium | Refer to DB31/T 661-2012 Appendix F AB-DTPA extraction/inductively coupled plasma emission spectrometer |
| available manganese | DB31/T 661-2012 Appendix F AB-DTPA extraction/inductively coupled plasma emission spectrometer |
| available zinc | DB31/T 661-2012 Appendix F AB -DTPA extraction/inductively coupled plasma emission spectrometer |
| total mercury | USEPA 7473-2007 Thermal decomposition of atomic absorption spectrophotometry |

Note: Compared with the reference method, the only differencein available calcium detection is that the detection target is available calcium.

Example 1. Discovery of OTU Related to Total Nitrogen Content in the Soil

1. Collection of Soil Samples

In November 2017, research sample plots were set up in representative parks and green lands in 16 administrative regions of Shanghai, China.

Sampling method: The collection of soil samples followed the principle of multi-point mixing. Eight sampling points were selected from each sample plot. The soil drill with a diameter of 2.5 cm was used to collect the 0-20 cm topsoil respectively, and then the soil sample was mixed into one soil sample.

The soil samples were mixed evenly and passed through a 2 mm sieve to remove plant roots, gravel, and other debris. Then each soil sample was divided into two portions. One portion was air-dried naturally, and then as the sample for the determination of soil chemical properties in step 2; the other portion was stored at $-80°$ C., and then as the sample used for the extraction of total soil DNA in step 3.

2. Analysis and Determination of Soil Quality Indicators

In step 1, the natural air-dried soil samples were analyzed and determined for soil quality indicators. The measurement results of soil quality indicators were shown in Table 2.

TABLE 2

Test results of soil quality indicators

| Detection Indicator | minimum value | maximal value | average value |
|---|---|---|---|
| pH | 5.32 | 8.79 | 7.92 |
| conductivity(μS/cm) | 60.70 | 656.52 | 142.57 |
| organic matter(g/kg) | 7.10 | 46.62 | 27.59 |
| total nitrogen(g/kg) | 0.47 | 2.34 | 1.13 |
| available nitrogen(mg/kg) | 25.85 | 152.64 | 84.68 |
| total phosphorus(g/kg) | 0.42 | 1.00 | 0.68 |
| total potassium(g/kg) | 15.80 | 25.43 | 19.08 |
| available phosphorus(mg/kg) | 0.85 | 48.20 | 8.66 |
| available potassium(mg/kg) | 28.20 | 397.89 | 188.90 |
| available sulfur(mg/kg) | 13.06 | 96.65 | 52.36 |
| available chlorine(mg/L) | 4.16 | 1900.00 | 41.46 |
| exchangeable sodium(mg/L) | 3.30 | 993.00 | 21.60 |
| total arsenic(mg/kg) | 4.81 | 13.50 | 8.73 |
| total bronze(mg/kg) | 16.38 | 99.84 | 36.05 |
| total zinc(mg/kg) | 87.38 | 223.87 | 125.52 |
| total lead(mg/kg) | 18.24 | 52.18 | 29.01 |
| total chromium(mg/kg) | 55.40 | 101.00 | 72.90 |
| total nickel(mg/kg) | 27.40 | 44.59 | 36.62 |
| available calcium(mg/kg) | 198.36 | 366.95 | 282.89 |
| available manganese(mg/kg) | 8.55 | 29.46 | 16.76 |
| available zinc(mg/kg) | 1.81 | 29.58 | 9.05 |
| total mercury(mg/kg) | 0.05 | 0.57 | 0.21 |

3. Diversity Analysis of Soil Archaea Population (1). Extraction of Total DNA from Soil Samples Stored at $-80°$ C. In Step 1.

Total DNA of soil samples was extracted with Mo_Bio_PowerSoil® DNA Isolation Kit (Mo_Bio Laboratories, Carlsbad, Inc., CA, USA). Each soil sample was extracted twice repeatedly, and the total DNA extracted twice was mixed to obtain a DNA sample. For 76 soil samples, corresponding 76 DNA samples were obtained. All DNA samples were stored at $-80°$ C.

The DNA quality was examined by Nanodrop 2000 ultra-micro spectrophotometer and 0.8% agarose gel electrophoresis (5V cm$^{-1}$, 45 min). The OD260/OD280 of the 76 DNA samples were in the range of 1.8-2.0, the maximum value of OD260/OD280 was 1.98, and the minimum value of OD260/OD280 was 1.81.

(2). Archaea 16S rRNA Gene Amplification and High-Throughput Sequencing

The DNA sample was used as a template, and a primer pair composed of primer 524F-10-ext (SEQ ID NO.4) and primer Arch958R-mod (SEQ ID NO.5) was used for PCR amplification. After PCR amplification was completed, the PCR products were subjected to 2% agarose gel electrophoresis, and then the target bands were cut and purified by the GeneJET Gel Recovery Kit (Thermo Scientific), and then the sequencing library was constructed, and the Illumina MiSeq sequencing platform (Illumina, San Diego, CA, USA) was used for sequencing.

Primer 524F-10-ext (SEQ ID NO.4) and primer Arch958R-mod (SEQ ID NO.5) are universal primers for archaea, and the target sequence is located in the V4-V5 variable region of the archaea 16S rRNA gene.

524F-10-ext (SEQ ID NO. 4 of sequence listing):
5'-TGYCAGCCGCCGCGGTAA-3';

Arch958R-mod (SEQ ID NO. 5 of sequence listing):
5'YCCGGCGTTGAVTCCAATT-3';

Y stands for C or T; V stands for G, A or C.

The reaction system for PCR amplification was 30 μL. The active ingredients were 15 μL of Phusion® High-Fidelity PCR Master Mix (New England Biolabs), primers, and template DNA. In the reaction system, the concentration of primer 524F-10-ext (SEQ ID NO.4) and primer Arch958R-mod (SEQ ID NO.5) were both 0.2 μM. In the reaction system, the content of template DNA was 10 ng.

The PCR amplification reaction program: 95° C. pre-denaturation 3 min; 95° C. denaturation 30 s, 55° C. annealing 30 s, 72° C. extension 45 s, 33 cycles; 72° C. extension 5 min.

(3). High-Throughput Data Analysis and Results

The specific steps for bioinformatics analysis of high-throughput sequencing results were as follows: 1) Extracted the same sample sequence from the original data according to the sample-specific label to form a separate file, and removed the label and primer sequences; 2) FLASH (V1.2.7) software was used for sequence splicing; 3) Qiime (V1.7.0) software was used to perform quality filtering on the original sequence after sequencing; 4) UCHIME software was used to detect chimeras and deleted them; 5) Uparse (v7.0.1001) software was used to divide Operational Taxonomic Units (OTUs) at a similarity level of 95%; 6) Since the reliability of the single-copy sequence was questioned, the single-copy sequence was removed in the subsequent analysis; 7) In order to remove the influence of different sequencing depths between samples, the sample OTU table was homogenized to the same sequencing depth; 8) Aligned the sequence of OTUs based on the RDP database and determined the taxonomic status thereof.

Total 27765 archaea 16S rRNA gene sequences were selected from each sample for subsequent analysis. The archaea 16S rRNA gene sequences were classified at 95% sequence similarity, and a total of 580 OTUs were obtained.

4. Correlation Analysis Between Soil Archaea Groups and Soil Quality Indicators

Performed Pearson correlation analysis on the 580 OTUs obtained in step 3 and the soil chemical indicators data obtained in step 2.

The results show that among 580 OTUs, the abundance of archaeal OTU300 in the soil has the strongest correlation with the total nitrogen content in the soil; the correlation between the abundance of archaea OTU69 in the soil and the total nitrogen content of the soil comes second; meanwhile, the abundance of archaea OTU300 in the soil was significantly positively correlated with the total nitrogen content of the soil, with a correlation coefficient r of 0.486; the correlation coefficient between the abundance of archaea OTU69 in the soil and the total nitrogen content of the soil was −0.293. The abundance of archaea OTU300 or archaea OTU69 in the soil can be used to reflect the total nitrogen content of the soil.

Example 2. Establishing a Linear Relationship Between OTU and Soil Chemical Characteristics 1. Archaea Marker Gene Probe Design According to the sequencing results, a probe for detecting OTU300 was designed.

Probe300-1 probe (SEQ ID NO. 6 of sequence listing):
5'-AGGATACTACAGAGCTAGGA-3'.

Probe300-2 probe (SEQ ID NO. 1 of sequence listing):
5'-TTGGCTTCGCGCTAACCCAGT-3'.

The Probe300-1 (SEQ ID NO.6) was a Taqman probe with a fluorescent group FAM at its 5'end and a fluorescence quenching group TAMRA at its 3'end. Probe300-2_(SEQ ID NO.1) was a Taqman probe with a fluorescent group FAM at its 5'end and a fluorescence quenching group TAMRA at its 3'end.

According to the sequencing results, a probe for detecting OTU69 was designed.

Probe69-1 probe (SEQ ID NO. 7 of sequence listing):
5'-ACCCGCTCAACGGTTGGGCT-3'.

Probe69-2 probe (SEQ ID NO. 8 of sequence listing):
5'-TGATGGGATGGCCTCGAGCT-3'.

Probe69-1 (SEQ ID NO.7) was a Taqman probe with a fluorescent group FAM at its 5'end and a fluorescence quenching group TAMRA at its 3'end. Probe69-2 (SEQ ID NO.8) was a Taqman probe with a fluorescent group FAM at its 5'end and a fluorescence quenching group TAMRA at its 3'end.

2. Determination of the Copy Number of Archaea Marker Gene in Soil

According to the measured value, soil samples with a gradient distribution of total nitrogen content were randomly selected from the soil samples in step 1 of Example 1.

(1) Took soil samples for extraction of the total DNA.

The extraction method of the total DNA was the same as the (1) of step 3 of Example 1.

(2) Took the template solution (that was, the total DNA solution obtained in step (1)), and performed fluorescent quantitative PCR (probe method) on the LightCycler® 96 real-time fluorescent quantitative PCR instrument.

A primer pair consisting of the primer 524F-10-ext (SEQ ID NO.4) and the primer Arch958R-mod(SEQ ID NO.5) was used. A Probe300-1 probe (SEQ ID NO.6) or Probe300-2 probe (SEQ ID NO.1) or Probe69-1 probe (SEQ ID NO.7) or Probe69-2 probe (SEQ ID NO.8) was used.

Reaction system (20 μL): 10 μL Premix Ex Taq (Takara, Dalian, China), 0.4 μL primer 524F-10-ext (SEQ ID NO.4), 0.4 μL primer Arch958R-mod (SEQ ID NO.5), 0.2 μL probe (SEQ ID NO.1), 2 μL template solution and 7 μL sterile water. In the reaction system, the concentration of primer 524F-10-ext (SEQ ID NO.4) was 0.2 μM, the concentration of primer Arch958R-mod (SEQ ID NO.5) was 0.2 μM, and the concentration of probe (SEQ ID NO.1) was 0.1 μM. In the reaction system, the content of template DNA was 7 ng.

Reaction program: 95° C. pre-denaturation for 120 s; 95° C. denaturation for 10 s, 60° C. annealing extension for 45 s, 45 cycles.

The specificity of amplification was determined by the melting curve.

The Ct value was substituted into the standard curve equation to obtain the copy number of the target OTU, and then the copy number content (unit was copy number/g, that was, the copy number of the target OTU in each gram of the dry soil sample) of the target OTU in the soil sample was calculated.

The preparation method of the standard curve equation was shown in step (3).

(3) Constructed a Standard Curve for Real-Time PCR

Ligated the DNA molecule (amplified from total soil DNA) shown as SEQ ID NO.2 of the sequence listing to the pMD18-T vector to obtain OTU300 standard plasmid. Using TE buffer as the solvent, prepared the standard plasmid solutions containing different concentrations of OTU300 standard plasmid (the DNA concentration in the standard plasmid solution was measured by Nanodrop 2000 ultra-micro spectrophotometer, and was converted into DNA copy number, which was the OTU300 copy number). Each standard plasmid solution was used as a template solution, and detection was performed according to the method of step (2) (using Probe300-1 probe (SEQ ID NO.6) or Probe300-2 probe (SEQ ID NO.1)) to obtain the standard curve equation with the logarithm of OTU300 copy number (logarithm with base 10) as the independent variable and Ct as the dependent variable.

SEQ ID NO. 2:
TGTCAGCCGCCGCGGTAATACCAGCACCCCGAGTGGTCGGGACGATT

ATTGGGCCTAAAGCATCCGTAGCCGGTTCTGCAAGTCTCCCGTTAAA

TCCAACTGCTCAACAGGTGGGCTGCGGAGGATACTACAGAGCTAG

GAGGCAGGAGAGGCAAGCGGTACTCAGTGGGTAGGGGTAAAATCCG

TTGATCCATTGAAGACCACCAGTGGCGAAGGCGGCTTGCCAGAATG

CGCTCGACGGTGAGGGATGAAAGCTGGGGAGCAAACCGGATTAGA

TACCCGGGTAGTCCCAGCCGTAAACGATGCAGACTCGGTGATGGGTT

GGCTTCGCGCTAACCCAGTGCCGCAGGGAAGCCGTTAAGTCTGCCGC

CTGGGTAGTACGGTCGCAAGACTGAAACTTAAAGGAATTGGCGGGG

GAGCACCACAAGGGGTGAAGCCTGCGGTTCAATTGGATTCAACGCC

GGA

Ligated the DNA molecule (amplified from total soil DNA) shown as SEQ ID NO.3 of the sequence listing to the pMD18-T vector to obtain OTU69 standard plasmid. Using TE buffer as the solvent, prepared the standard plasmid solutions containing different concentrations of OTU69 standard plasmid (the DNA concentration in the standard plasmid solution was measured by Nanodrop 2000 ultra-micro spectrophotometer, and was converted into DNA copy number, which was the OTU69 copy number). Each standard plasmid solution was used as a template solution, and detection was performed according to the method of step (2) (using Probe69-1 probe (SEQ ID NO.7) or Probe69-2 probe (SEQ ID NO.8) to obtain the standard curve equation with the logarithm of OTU69 copy number (logarithm with base 10) as the independent variable and Ct as the dependent variable.

SEQ ID NO. 3:
TGTCAGCCGCCGCGGTAATACCAGCACCCCGAGTGGTCGGGACGATT

ATTGGGCCTAAAGCATCCGTAGCCGGTCATGCAAGTCTTCCGTTAAA

TCCACCCGCTCAACGGTTGGGCTGCGGAGGATACTACGTGGCTAG

GAGGCGGGAGAGGCAAGCGGTACTCAGTGGGTAGGGGTAAAATCCT

TTGATCCATTGAAGACCACCAGTGGCGAAGGCGGCTTGCCAGAACG

CGCTCGACGGTGAGGGATGAAAGCTGGGGAGCAAACCGGATTAGA

TACCCGGGTAGTCCCAGCCTGTAAACGATGCAGACTCGGTGATGGGAT

GGCCTCGAGCTATCCCAGTGCCGCAGGGAAGCCGTTAAGTCTGCCGC

CTGGGGAGTACGGTCGCAAGACTGAAACTTAAAGGAATTGGCGGGG

GAGCACCACAAGGGGTGAAGCCTGCGGTTCAATTGGATTCAACGCC

GGA

The efficiency of fluorescence quantitative PCR amplification was between 90% and 110%.

3. Establishment of a Linear Relationship Between Copy Number of Archaea Marker Gene and Chemical Characteristics of the Soil The results of the measured total nitrogen values (unit: g/kg), Ct values, and target OTU copy number content (unit: copy number/g) of the soil samples were shown in Table 3. The measured values of total nitrogen of the soil samples were the data obtained in step 2 of Example 1. The Ct values and the copy number content of the target OTU of the soil samples were the data obtained in step 2 of the present embodiment. A Probe300-2 probe (SEQ ID NO.1) was used to perform fluorescence quantitative PCR, the relative abundance of target OTU of the soil (reflected as the copy number of target OTU in the soil) had a good linear relationship with the total nitrogen content of the soil.

TABLE 3

| Soil sample number | The measured value of total nitrogen | Probe300-1 | | Probe300-2 | | Probe69-1 | | Probe69-2 | |
|---|---|---|---|---|---|---|---|---|---|
| | | Ct value | copy number content | Ct value | copy number content | Ct value | copy number content | Ct value | copy number content |
| 1 | 2.34 | 20.59 | $2.5 \times 10^7$ | 18.19 | $5.0 \times 10^7$ | 21.42 | $1.3 \times 10^7$ | 18.96 | $1.4 \times 10^7$ |
| 2 | 1.94 | 21.71 | $1.2 \times 10^7$ | 18.80 | $3.3 \times 10^7$ | 21.24 | $1.4 \times 10^7$ | 19.06 | $1.4 \times 10^7$ |
| 3 | 1.46 | 22.49 | $7.4 \times 10^6$ | 20.20 | $1.4 \times 10^7$ | 21.80 | $9.8 \times 10^6$ | 19.48 | $1.0 \times 10^7$ |
| 4 | 1.15 | 23.60 | $3.6 \times 10^6$ | 21.24 | $6.9 \times 10^6$ | 21.53 | $1.2 \times 10^7$ | 19.16 | $1.3 \times 10^7$ |
| 5 | 0.93 | 23.63 | $3.5 \times 10^6$ | 21.02 | $8.0 \times 10^6$ | 21.41 | $1.3 \times 10^7$ | 19.44 | $1.0 \times 10^7$ |
| 6 | 0.62 | 23.02 | $5.3 \times 10^6$ | 22.19 | $3.7 \times 10^6$ | 21.20 | $1.4 \times 10^7$ | 18.49 | $2.0 \times 10^7$ |
| 7 | 0.47 | 24.20 | $2.5 \times 10^6$ | 26.08 | $0.3 \times 10^6$ | 20.54 | $2.2 \times 10^7$ | 18.31 | $2.3 \times 10^7$ |
| Linear equation | | $y = 0.0745x + 0.6330$ | | $y = 0.0361x + 0.6785$ | | $y = -0.8773x + 2.4962$ | | $y = -0.6935x + 2.3074$ | |
| $R^2$ | | 0.7867 | | 0.9151 | | 0.2695 | | 0.2651 | |

Note: soil sample 1, collected from a green land of the park in Fengxian District; soil sample 2, collected from a green land of the park in Huangpu District; soil sample 3, collected from a green land of the park in Hongkou District;

soil sample 4, collected from a green land of the park in Songjiang District; soil sample 5, collected from a green land of the park in Qingpu District; soil sample 6, collected from a green land of the park in Xuhui District; soil sample 7, collected from a green land of the park in Baoshan District.

Figure 1:
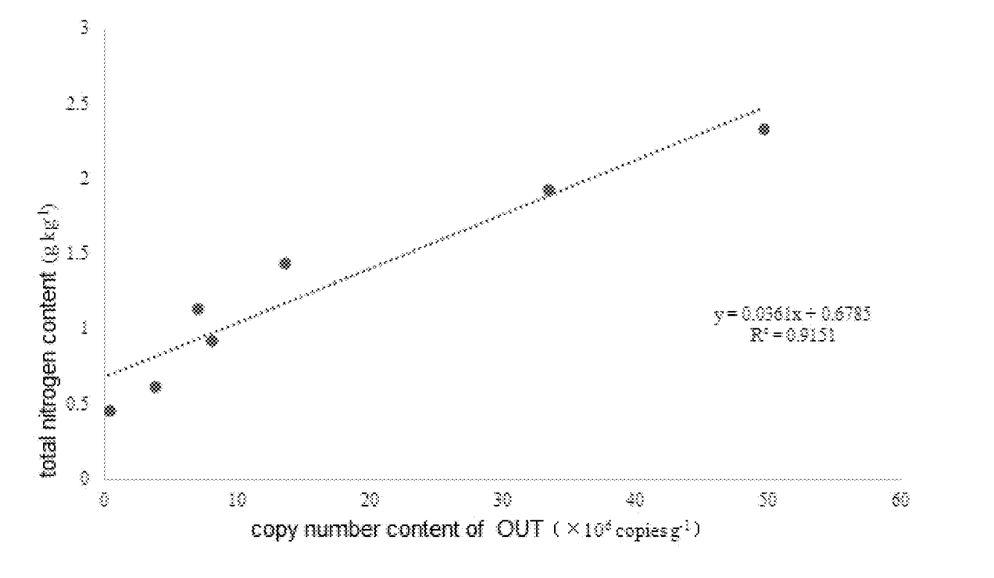
FIG. 1 shows the linear relationship between the copy number content of the target OTU and the total nitrogen content of the soil.

A Probe300-2 probe (SEQ ID NO.1) was used to perform fluorescence quantitative PCR, the linear relationship between the copy number content of the target OTU in the soil and the total nitrogen content of the soil as shown in FIG. 1. The linear equation is $y=0.0361x+0.6785$; $R^2=0.9151$; y represents the total nitrogen content (g/kg), and x represents the copy number content of the target OTU ($\times 10^6$ copies/g).

Example 3. Molecular Detection of the Total Nitrogen Content of the Soil Samples of Unknown Urban Green Lands Randomly selected three green lands in Shanghai Botanical Garden, Nanjing Xuanwu Lake Park, and Suzhou Wujiang Park in China.

Sampling method: The collection of soil samples followed the principle of multi-point mixing: Eight sampling points were selected from each sample plot. The soil drill with a diameter of 2.5 cm was used to collect the 0-20 cm topsoil respectively, and then the soil sample was mixed into one soil sample.

The soil samples were mixed evenly and passed through a 2 mm sieve to remove plant roots, gravel, and other debris. Then each soil sample was divided into two portions. One portion was air-dried naturally, and then as a sample to be detected to get the actual measured value of the total nitrogen content (unit: mg/kg). The other part was stored at −80° C. and then as a sample for extraction of total soil DNA.

1. Extraction of total DNA of soil samples. Adopted Mo_Bio_PowerSoil® DNA Isolation Kit (Mo_Bio Laboratories, Carlsbad, Inc., CA, USA). Extracted each soil sample two times and mixed all of the extracted total DNA to get a DNA sample.

2. Took the template solution (i.e., the DNA sample obtained in step 1), and performed fluorescent quantitative PCR (probe method) on the LightCycler® 96 real-time fluorescent quantitative PCR instrument. Reaction system (20 μL): 10 μL Premix Ex Taq (Takara, Dalian, China), 0.4 μL primer 524F-10-ext (SEQ ID NO.4), 0.4 μL primer Arch958R-mod (SEQ ID NO.5), 0.2 μL Probe300-2 probe (SEQ ID NO.1), 2 μL template solution, and 7 μL sterile water. In the reaction system, the concentration of primer 524F-10-ext (SEQ ID NO.4) was 0.2 μM, the concentration of primer Arch958R-mod (SEQ ID NO.5) was 0.2 μM, and the concentration of Probe300-2 probe (SEQ ID NO.1) was 0.1 μM. In the reaction system, the content of template DNA was 7 ng.

Reaction program: 95° C. pre-denaturation for 120 s; 95° C. denaturation for 10 s, 60° C. annealing extension for 45 s, 45 cycles.

The Ct value was substituted into the standard curve equation to obtain the copy number of OTU300, and then the copy number content of OTU300 of the soil sample was calculated (the unit was copy number/g, that was, the number of copies of OTU300 per gram of dry weight of soil sample).

The construction method of the standard curve equation was shown in step (3) of part 2 of Example 2.

3. The copy number content of OTU300 of the soil sample was substituted into the linear equation to obtain the calculated value of the total nitrogen content of the soil sample (unit: g/kg).

The linear equation is: $y=0.0361x+0.6785$; $R2=0.9151$; wherein y represents the total nitrogen content (g/kg), x represents the copy number content of OTU300 ($\times 10^6$ copies/g).

The results of the copy number content of OTU300 in the soil sample (unit: copy number/g), the calculated value of the total nitrogen content of the soil sample (unit: g/kg), and the measured value of the total nitrogen content of the soil sample (unit: g/kg) are shown in Table 4.

TABLE 4

| | The copy number content of OTU300 (copy number/g) | The calculated value of the total nitrogen content (g/kg) | The measured value of the total nitrogen content (g/kg) |
| --- | --- | --- | --- |
| Sample 1 Shanghai Botanical Garden | $6.8 \times 10^6$ | 0.92 | 0.78 |
| Sample 2 Shanghai Botanical Garden | $4.1 \times 10^6$ | 0.83 | 0.71 |
| Sample 3 Shanghai Botanical Garden | $5.9 \times 10^6$ | 0.89 | 0.75 |
| Sample 4 Nanjing Xuanwu Lake Park | $1.2 \times 10^7$ | 1.12 | 1.38 |
| Sample 5 Nanjing Xuanwu Lake Park | $1.3 \times 10^6$ | 0.73 | 0.61 |
| Sample 6 Nanjing Xuanwu Lake Park | $6.8 \times 10^6$ | 0.92 | 0.78 |
| Sample 7 Suzhou Wujiang Park | $2.6 \times 10^5$ | 0.69 | 0.47 |
| Sample 8 Suzhou Wujiang Park | $8.8 \times 10^6$ | 1.00 | 1.33 |
| Sample 9 Suzhou Wujiang Park | $1.6 \times 10^6$ | 0.74 | 0.64 |

INDUSTRIAL APPLICATION

The invention discloses a method for detecting the total nitrogen content of the soil or comparing the total nitrogen content of the soil between different plots, which has the following advantages: detecting the total nitrogen content of the soil or comparing the total nitrogen content of the soil between different plots, and small sample demand, no need for pre-treatment, short required time, low labor cost, realizing the rapid automatic detection of large quantities of samples. The present invention deserves to apply and promote in the evaluation of soil samples.

The invention claimed is:

1. A method for detecting a total nitrogen content in soil comprising the following steps:
   providing a primer comprising the sequence of SEQ ID NO. 4 and a primer comprising the sequence of SEQ ID NO. 5 as an amplification primer pair;
   providing a nucleotide sequence of a probe shown as SEQ ID NO. 1 of the sequence listing;
   using the isolated total DNA of a soil sample as a template to perform real-time fluorescent quantitative PCR on the soil sample on a fluorescent quantitative PCR instrument; and
   obtaining a cycle threshold (Ct) value by real-time fluorescent quantitative PCR and calculating a copy number according to the Ct value, and calculating the total nitrogen content by the copy number content in the soil sample;
   wherein the probe is a real-time fluorescent quantitative PCR probe with a fluorescent group 5(6)-Carboxyfluorescein at its 5' end and a fluorescence quenching group 5(6)-Carboxytetramethylrhodamine at its 3' end.

2. A method for detecting a total nitrogen content in soil, comprising the following steps:
   1) obtaining the total nitrogen content of a first soil sample from a known plot;
   2) extracting a total DNA sample from the first soil sample and, using the total DNA sample as a template, using universal primers for amplifying a V4-V5 variable region of an archaeal 16S rRNA gene and performing high-throughput sequencing;
   3) classifying the archaeal 16S rRNA gene sequences from the first soil sample to obtain multiple operational taxonomic units (OTUs);
   4) performing a correlation analysis between the multiple OTUs obtained in step 3) and the total nitrogen content of the first soil sample to obtain a correlation ranking between the relative abundance of the archaeal OTUs and the total nitrogen content of the first soil sample, and selecting the archaeal OTU with the highest correlation ranking as the target OTU;
   5) designing a fluorescent probe for detecting the target OTU;
   6) using the universal primers and the fluorescent probe to perform an amplification reaction in a fluorescent quantitative PCR instrument to obtain a Ct value and a copy number of the target OTU, and calculating the copy number content of the target OTU in the first soil sample of the known plot;
   7) obtaining a linear relationship equation based on the copy number content of the target OTU and the total nitrogen content of the first soil sample; and 8) obtaining a total DNA sample of a second soil sample of a plot to be tested, obtaining the copy number content of the second soil sample of the plot to be tested according to step 6), substituting the copy number content into the linear relationship equation obtained in step 7), and obtaining the total nitrogen content of the second soil sample of the plot to be tested;

wherein the second soil sample is obtained from an urban relocation site.

3. The method according to claim 2, wherein the universal primers in step 2) consist of SEQ ID NO. 4 and SEQ ID NO. 5.